United States Patent
Norden

(10) Patent No.: US 9,446,313 B2
(45) Date of Patent: Sep. 20, 2016

(54) DEVICE, GAME AND CONTROL METHODS THEREFOR

(71) Applicant: KING.COM LIMITED, St. Julians (MT)

(72) Inventor: Klas Norden, St. Julians (MT)

(73) Assignee: KING.COM LTD., St. Julians (MT)

( * ) Notice: Subject to any disclaimer, the term of this patent is extended or adjusted under 35 U.S.C. 154(b) by 201 days.

(21) Appl. No.: 14/206,352

(22) Filed: Mar. 12, 2014

(65) Prior Publication Data

US 2015/0258444 A1    Sep. 17, 2015

(51) Int. Cl.
A63F 13/12    (2006.01)
A63F 13/56    (2014.01)
A63F 13/75    (2014.01)
A63F 3/00     (2006.01)

(52) U.S. Cl.
CPC .............. *A63F 13/56* (2014.09); *A63F 13/75* (2014.09); *A63F 2003/0075* (2013.01); *A63F 2003/00996* (2013.01)

(58) Field of Classification Search
CPC ....... A63F 13/56; A63F 13/537; G07F 17/32
See application file for complete search history.

(56) References Cited

U.S. PATENT DOCUMENTS

| | | | | |
|---|---|---|---|---|
| 2006/0068876 A1* | 3/2006 | Kane | ............... | G07F 17/32 463/16 |
| 2011/0136572 A1* | 6/2011 | Karn | ............... | A63F 13/00 463/30 |
| 2013/0172061 A1* | 7/2013 | Iosilevsky | ............... | A63F 13/005 463/9 |
| 2013/0331162 A1* | 12/2013 | Krivicich | ............... | G06F 3/04812 463/10 |
| 2014/0080556 A1* | 3/2014 | Knutsson | ............... | A63F 13/12 463/7 |
| 2014/0080558 A1* | 3/2014 | Knutsson | ............... | A63F 13/12 463/10 |
| 2014/0080559 A1* | 3/2014 | Knutsson | ............... | A63F 13/12 463/10 |
| 2014/0080560 A1* | 3/2014 | Knutsson | ............... | A63F 13/12 463/10 |
| 2014/0080600 A1* | 3/2014 | Knutsson | ............... | A63F 13/12 463/31 |
| 2014/0081438 A1* | 3/2014 | Knutsson | ............... | A63F 13/12 700/92 |
| 2014/0106876 A1* | 4/2014 | Knutsson | ............... | A63F 13/12 463/31 |

(Continued)

FOREIGN PATENT DOCUMENTS

MT    WO 2013174933 A1 *  11/2013    ......... G07F 17/3204

OTHER PUBLICATIONS

"Candy Crush Saga" description written by Wikipedia, printed from URL <https://en.wikipedia.org/wiki/Candy_Crush_Saga>, 6 pages.*

(Continued)

*Primary Examiner* — Jason Skaarup
(74) *Attorney, Agent, or Firm* — Saul Ewing LLP

(57) ABSTRACT

In an embodiment there is provided a device having a user interface configured to display a game board having a plurality of game objects, each game object having one or more characteristics, said user interface being configured to receive user input, and at least one processor in connection or communication with at least one memory configured to detect a selection of at least one game object with respect to said displayed game board in response to player input, re-order said selected game objects on said displayed game board with respect to said input, create a further game object sharing at least one of the one or more characteristics of said re-ordered game objects in accordance with at least one rule stored in said at least one memory, and replace said re-ordered game objects with said further game object for display.

26 Claims, 11 Drawing Sheets

(56) References Cited

U.S. PATENT DOCUMENTS

| | | | | |
|---|---|---|---|---|
| 2014/0106877 A1* | 4/2014 | Knutsson | ................ | A63F 13/12 463/31 |
| 2014/0106878 A1* | 4/2014 | Knutsson | ................ | A63F 13/12 463/31 |
| 2014/0113704 A1* | 4/2014 | Knutsson | ................ | A63F 13/12 463/23 |
| 2014/0128159 A1* | 5/2014 | Knutsson | ................ | A63F 13/12 463/31 |
| 2014/0135102 A1* | 5/2014 | Knutsson | ................ | A63F 13/12 463/23 |
| 2014/0135104 A1* | 5/2014 | Knutsson | ................ | A63F 13/12 463/24 |
| 2014/0135120 A1* | 5/2014 | Knutsson | ................ | A63F 13/12 463/31 |
| 2014/0235338 A1* | 8/2014 | Hansson | ................ | A63F 13/00 463/31 |
| 2014/0342791 A1* | 11/2014 | Hugh | ................ | A63F 13/80 463/9 |
| 2014/0364210 A1* | 12/2014 | Murray | ................ | G07F 17/3272 463/31 |
| 2014/0370950 A1* | 12/2014 | Hansson | ................ | A63F 13/2145 463/9 |

OTHER PUBLICATIONS

"How to Play Candy Crush Saga" written by wikiHow, published on or before Aug. 20, 2013, printed from URL <http://web.archive.org/web/20130820142414/http://www.wikihow.com/Play-Candy-Crush-Saga>, 7 pages.*

Screenshots of Video entitled "Candy Crush Saga Android Level 1-10" published by Mohd Syukri Omar on YouTube on or before Jun. 17, 2013, printed from URL <https://www.youtube.com/watch?v=4mnW0fStfr8>, 25 pages.*

"PopCap Web Games" written description of Bejeweled and scoring thereof, published on or before Jan. 6, 2012, printed from URL <https://web.archive.org/web/20120106170300/http://support.popcap.com/web-games>, 3 pages.*

Bejeweled Twist description written by Wikipedia, published on or before Jan. 12, 2013 and printed from URL <https://web.archive.org/web/20130112035013/http://en.wikipedia.org/wiki/Bejeweled_Twist>, 3 pages.*

"Candy Crush Saga All Help: Newbies Guide . . . How to play Candy Crush Saga" published on or before Jan. 8, 2013 and printed from URL <http:web.archive.org/web/20130123070206/http://candycrushsagaallhelp.blogspot.com/201>, 7 pages.*

"Candy Swipe" published on or before Jan. 2, 2011 and printed from URL <https://web.archive.org/web/20110102164717/http://www.candyswipe.com/>, 2 pages.*

"Bejeweled Series" written by Wikipedia, published on or before Mar. 21, 2013 and printed from URL <http://web.archive.org/web/20130321214929/http://en.wikipedia.org/wiki/Bejeweled_(series)>, 2 pages.*

* cited by examiner

DEVICE, GAME AND CONTROL METHODS THEREFOR

FIELD OF EMBODIMENTS

Some embodiments may relate to controlling a user interface responsive to user engagement with displayed game objects on the interface of a computer device.

Some embodiments may relate to computer devices having a user interface for engaging users or players in a computer game executable in an online environment.

BACKGROUND

There are many technical challenges and technical considerations facing the designer of computer games executed on user or computer devices having a user interface, such as designing a controllable user interface in the context of available computer devices and resources, which may be limited.

Another technical challenge can involve enabling a game to be fun, accessible and compelling even when there is limited display resource available, such as when a game is being played on a smartphone, tablet or other small or portable computer. Another significant challenge is that of user engagement. Engagement involves designing gameplay to be engaging and rewarding to players. This typically requires games to be easily understood at their simplest or introductory levels, providing rewarding gameplay with simple to complex game mechanics, and becoming progressively more challenging so that players are not bored, but remain engaged and develop rewarding skills.

Effective engagement may also require various forms of feedback to reinforce the user or player sense of success and accomplishment.

There are therefore many technical challenges when designing computer implemented games, particularly in providing a challenge to a user or player that is engaging and rewarding so as to provoke repeat play. This may, but not exclusively apply to "casual games".

SUMMARY

According to an aspect, there is provided a computer implemented method of controlling a user interface responsive to user engagement with a displayed game board on said interface, the method comprising the following implemented by at least one processor of a computer device in communication with said interface and at least one memory: displaying a game board having a plurality of game objects, each game object having one or more characteristics, on said display, detecting a selection of at least one game object with respect to said displayed game board in response to user input, re-ordering said selected game objects on said displayed game board with respect to said input, creating a further game object sharing at least one of the one or more characteristics of said re-ordered game objects in accordance with at least one rule stored in said at least one memory, and replacing said re-ordered game objects with said further game object for display.

The user input may comprise touch and move input, for example selection and subsequent movement of a selected game object, so as to switch the position of the selected game object with that of a neighbouring or adjacent game object.

The characteristics of the game objects may comprise the game objects being coloured, and may further comprise that game objects be distinguished or matched to other game objects by being coloured differently or sharing the same colour.

The one or more game object characteristics may comprise attributes defining a displayed colour.

The one or more game object characteristics may comprise object type.

The object type may comprise a graphical representation of a jello or jelly or other desert or confectionary.

The at least one of the one or more characteristics shared by said further game object may comprise attributes defining a displayed colour.

The at least one of the one or more characteristics shared by said further game object may comprise object type.

The further game object type may comprise a larger graphical representation of said further game object in relation to a game object type characteristic.

The at least one rule for creating a further game object may comprise said processor determining that the re-ordered game objects in response to said input occupy a predefined pattern or shape configuration on said game board, and the re-ordered game objects of said pattern or shape configuration each have at least one same characteristic of the one or more characteristics.

The predefined pattern or shape configuration may comprise a 2×2 array of said game board.

The predefined pattern or shape configuration may comprise different sized array patterns or configurations such as 3×3, 4×4, 3×2, 3×4 according to correspondingly allocated rules.

Other predefined shapes or patterns may be configured, such as for example, triangular, hexagonal, octagonal, pentagonal, pyramidal or other patterns may be provided.

The further game object may have the characteristic that it can only be eliminated from the game board by subsequent user selection.

The selection of said further game object may eliminate said further game object and all other game objects sharing the same characteristic on said game board.

The further game object may be repositioned, with respect to a current position on the game board to occupy one or more tiles or positions on said game board adjacent to and immediately below the further game object current position. The repositioning of the further game object may be effected in dependence on the processor determining the elimination of game objects occupying said one or more tiles or positions adjacent to and immediately below the current position of the further game object.

The re-ordering of said game objects may comprise displacing said game objects to positions around the position of the further game object.

User selection of a group of neighbouring game objects, each having at least one same characteristic of the one or more characteristics and not arranged according to the pattern or shape configuration of said at least one rule may eliminate said group of neighbouring game objects.

The game board may then be re-ordered as other game objects fall into or replace the positions of those eliminated, and the process may then be repeated.

The game board may display a visual indicator of user progress towards a target, the visual indicator also indicating a bonus multiplier depending on the number of successive selections of groups of neighbouring game objects the user has input.

The visual indicator may indicate that the bonus multiplier is decreased when a user inputs a movement input.

According to another aspect there is provided a device having: a user interface configured to display a game board having a plurality of game objects, each game object having one or more characteristics, said user interface being configured to receive user input; and at least one processor in connection or communication with at least one memory configured to: detect a selection of at least one game object with respect to said displayed game board in response to player input, re-order said selected game objects on said displayed game board with respect to said input, create a further game object sharing at least one of the one or more characteristic of said re-ordered game objects in accordance with at least one rule stored in said at least one memory, and replace said re-ordered game objects with said further game object for display.

According to another aspect, there is provided a program comprising program code instructions that, when executed by a processor, causes said processor to perform the following steps: displaying a game board having a plurality of game objects, each game object having one or more characteristics, on said display, detecting a selection of at least one game object with respect to said displayed game board in response to user input, re-ordering said selected game objects on said displayed game board with respect to said input, creating a further game object sharing at least one of the one or more the characteristics of said re-ordered game objects in accordance with at least one rule stored in said at least one memory, and replacing said re-ordered game objects with said further game object for display.

According to yet another aspect, there is provided a computer readable storage device storing instructions that, when executed by a processor, causes said processor to perform the following steps: displaying a game board having a plurality of game objects, each game object having one or more characteristics, on said display, detecting a selection of at least one game object with respect to said displayed game board in response to user input, re-ordering said selected game objects on said displayed game board with respect to said input, creating a further game object sharing at least one of the one or more characteristics of said re-ordered game objects in accordance with, at least one rule stored in said at least one memory, and replacing said re-ordered game objects with said further game object for display.

According to another aspect there is provided a device comprising means configured to display a game board having a plurality of game objects, means for receiving user input, means for storing one or more data comprising characteristics of said game objects and at least one rule, the means for storing being connected by communication means to processing means configured to detect a selection of at least one game object with respect to said displayed game board in response to received user input from said input means, re-order said selected game objects on said displayed game board with respect to said detected input, create a further game object sharing at least one of the one or more stored characteristics of said re-ordered game objects in accordance with the at least one rule, and to replace said re-ordered game objects with said further game object for display by said display means.

The display means may comprise user interface means.

The user interface means may comprise the input means.

The input means may comprise touch control means.

The touch control means may comprise capacitive, resistive or gesture detecting means.

The means for storing said at least one rule may further store a predefined pattern or shape configuration.

The at least one rule stored by storing or storage means may further comprise determination of game objects displayed in said predefined pattern or shape configuration each having at least one same characteristic of the one or more stored characteristics.

The means for storing said predefined pattern or shape configuration may store said predefined pattern or shape configuration as a 2×2 array of said game board.

The processing means may control said display means to eliminate said further game object from the displayed game board in response to received user input of said input means, said received input comprising selection of said further game object.

The processing means may control said user interface to eliminate said further game object and all other game objects having at least one same characteristic as said further game object from the displayed game board in response to received user input of said input means, said received input comprising selection of said further game object.

BRIEF DESCRIPTION OF DRAWINGS

To understand some embodiments, reference will now be made by way of example only to the accompanying drawings, in which.

DETAILED DESCRIPTION OF SOME EMBODIMENTS

The techniques described herein can be implemented in for instance a computer implemented game which involves switching and clicking, or touch and move input to match objects and the elimination of such.

Figure 1:
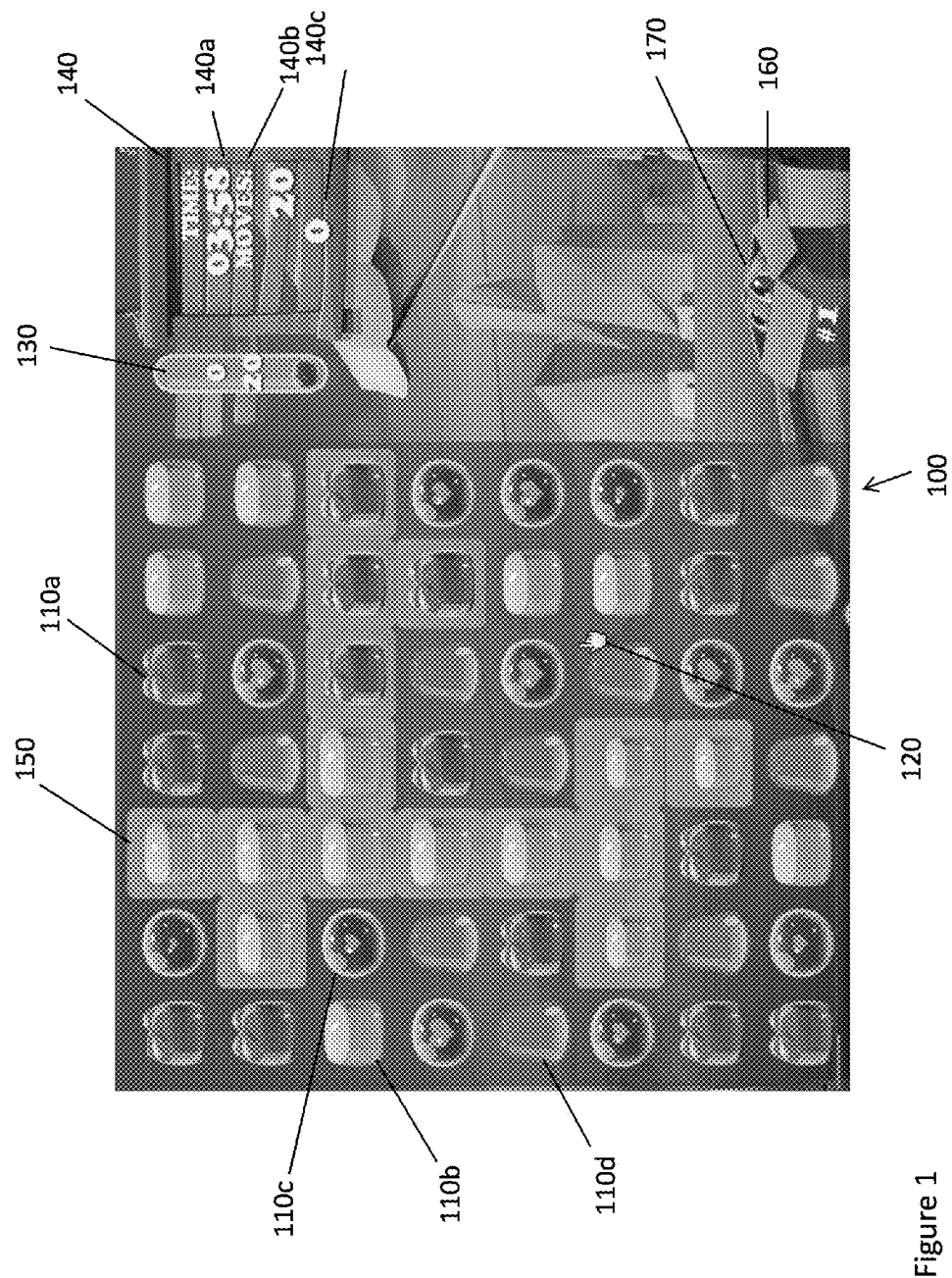
FIG. 1 shows an example embodiment of a game board.

An embodiment of a game, named "Chamello Jello"™, will now be described with reference to FIG. 1 which shows a game board 100. The game has a game board 100 upon which are disposed game objects 110a, 110b, 110c, 110d which may have varying characteristics. The characteristics may be one or more of colour, shape, and/or different types of objects. In this embodiment, the objects are differently coloured and shaped jellies or jellos as shown in FIG. 1. There is also provided a player selection indicator 120 which may be a representation of a pointer or hand in some embodiments, and may or may not be displayed to a user in some embodiments utilizing intuitive touchscreen or gesture recognition hardware. Of importance is that a selection mechanism is available for selecting, for example "clicking" and/or "switching", or for example a "touch and/or move" or slide mechanism for repositioning displayed game objects 110a, 110b, 110c, 110d. The exact mechanism may be according to the computing or user device resources provided, more of which will be described later with reference to FIGS. 2 and 3.

The game board 100 of FIG. 1 also shows, in this embodiment, a designated object target 130, and an area 140 comprising game information in the form of time elapsed 140a, number of moves remaining 140b and a score 140c.

One or more groups of neighbouring game objects 110b having at least one same characteristic as their neighbours 110b may be highlighted 150 as shown on the game board 100. A group of neighbouring game objects 150 thus highlighted may be selected by selection indicator 120 to eliminate the highlighted game objects 110b.

Also shown on the game board is a visual indicator 160, 170 which indicates progress by the user or player towards the target 130 in an engaging graphical manner as will be described later with reference to FIGS. 6 and 7.

In some embodiments, the game may be implemented so that a level or a game session is completed when all or designated game objects 110c on the game board 100 have been cleared or eliminated. In FIG. 1, the designated object target 130 indicates that twenty game objects 110c matching the indicated designated object target 130, must be cleared within either the certain number of moves 140b, or before the time limit 140a or a combination of both.

Game objects may be removed from the game board by selecting neighbouring grouped game objects 110b, 150 that share at least one same characteristic (e.g. colour, and/or type of object graphically represented) of the one or more characteristics. New game objects may then be generated and displayed in the positions on the game board vacated by those game objects removed or eliminated by said selections. The game objects replacing those eliminated may be displayed on the game board 100 and may subsequently cascade position by position in a vertical direction with respect to the game board to occupy those positions made available by the elimination of other game objects.

Neighbouring game objects may also be selected and moved to switch positions. If a certain pattern according to a rule matching game objects with at least one same characteristic results, then a further game object 500 may be created to replace those forming the matching pattern. This will be discussed in more detail later.

The user or player may in some embodiments be rewarded for good gameplay. For instance a series of consecutive selections of grouped neighbouring game objects may increase a bonus multiplier, whilst a move selection (switch) may reduce a bonus multiplier indicated on the game board to the player.

The game can in one embodiment end if the player or user runs out of time 140a or moves 140b before managing to reach a designated target 130 indicated on the game board 100.

The game board may have a number of game objects having different characteristics aligned in rows and columns, such as a 7×8 grid. Other grid sizes may be suitable. The game objects on the game board may have six (or any other suitable number of) contact points with other neighbouring or adjacent game objects.

Other game board layouts or configurations may be provided. For example, pyramidal, hexagonal, octagonal or other layouts comprising position spaces or tiles within the game board 100 may be provided for display.

In some embodiments the game objects may be depicted as jellos or jellies, of differing colours. The number of differing colours may for example be three or more colours.

Figure 2:
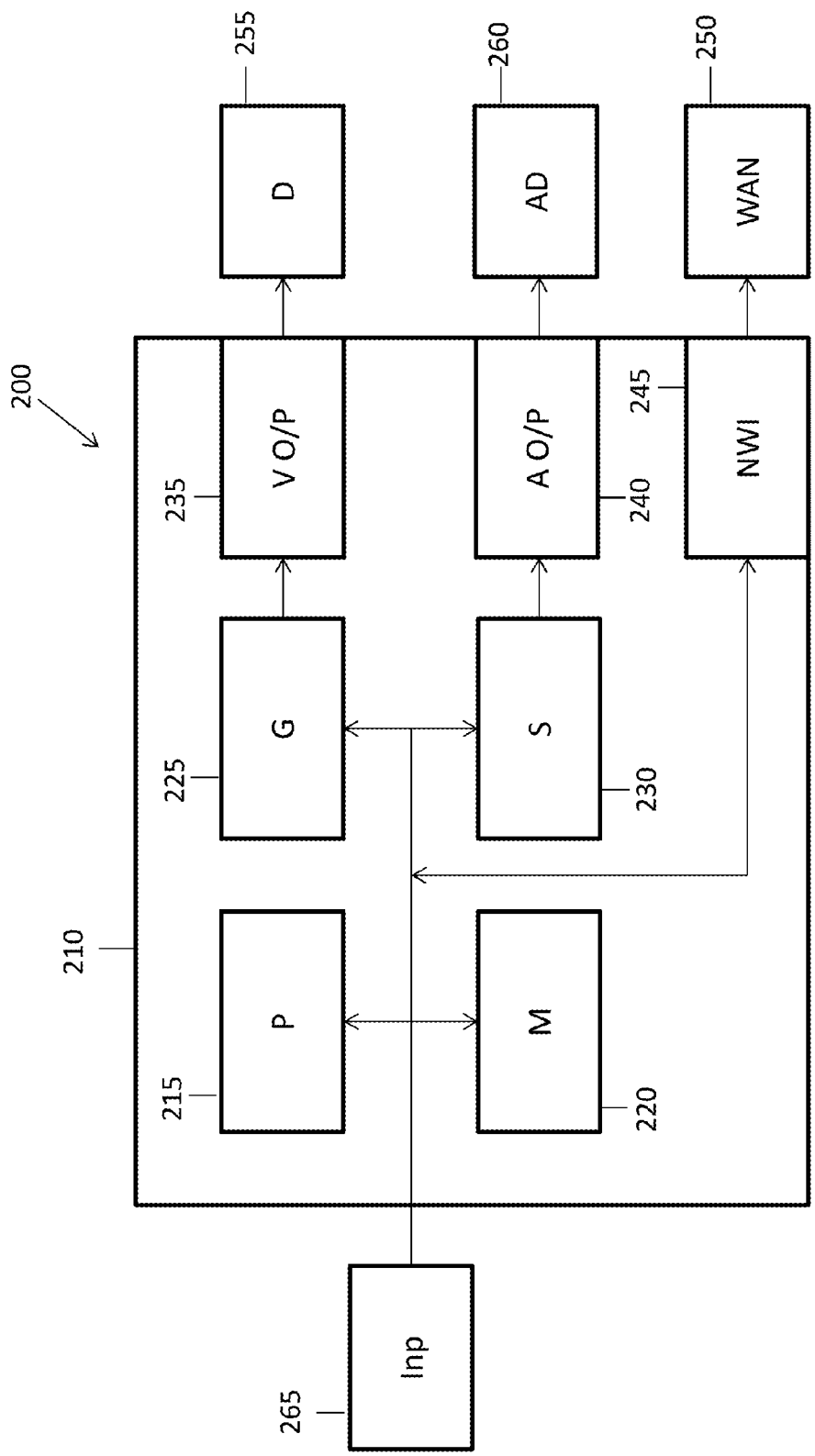
FIG. 2 shows an example user device in which some embodiments may be provided.

A schematic view of a user or computing device 200 according to an embodiment is shown in FIG. 2. All of the blocks shown are implemented by suitable circuitry. The blocks may be implemented in hardware and/or software. The user device may have a control part 210. The control part 210 has one or more processors 215 and one or more memories 220. The control part 210 is also shown as having a graphics controller 225 and a sound controller 230. It should be appreciated that one or other or both of the graphics controller 225 and sound controller 230 may be provided by the one or more processors 215.

The graphics controller 225 is configured to provide a video output 235. The sound controller 230 is configured to provide an audio output 240. The controller 210 has an interface 245 allowing the device to be able to communicate with a network 250 such as the Internet or other communication infrastructure.

The video output 235 is provided to a display 255. The audio output 240 is provided to an audio device 260 such as a speaker and/or earphone(s).

The device 200 has an input device 265. The input device 265 can take any suitable format and can be one or more of a keyboard, mouse, touch screen, joystick or game controller. It should be appreciated that the display 255 may in some embodiments also provide the input device 265 by way of an integrated touch screen for example.

The blocks of the controller 210 are configured to communicate with each other by an interconnect such as a bus or any other suitable interconnect and/or by point to point communication.

It should be appreciated that in some embodiments, the controller 210 may be implemented by one or more integrated circuits, at least in part.

The user device 200 is shown by way of example only. In alternative embodiments, one or more of the parts may be omitted. Alternatively or additionally, some embodiments may comprise one or more other parts. Alternatively or additionally, one or more parts may be combined.

Figure 3:
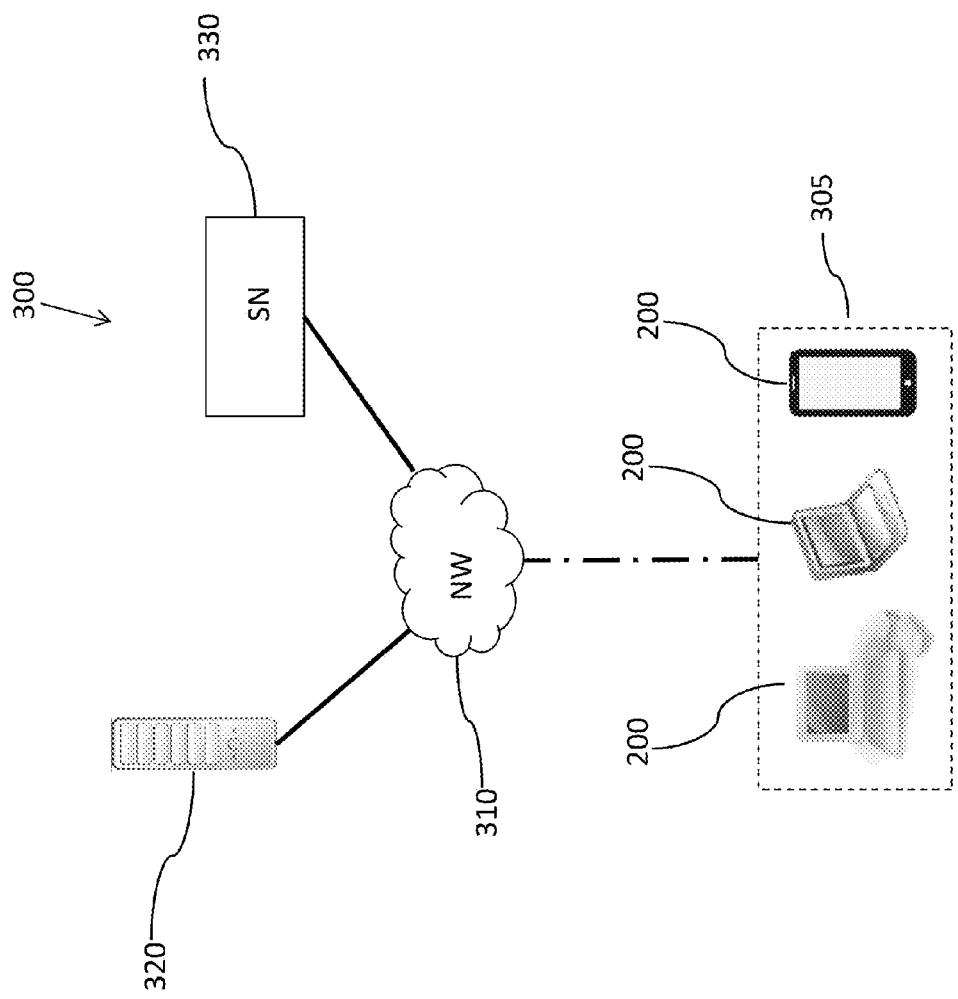
FIG. 3 shows an example system in which some embodiments may be provided.

FIG. 3 schematically shows a system 300 in some embodiments. The system 300 comprises a server 320 which may store databases of game players' details, profiles, high scores and so on. In practice, one or more databases may be provided. Where more than one server is provided, the database(s) may be provided in one database or across two or more servers 320. The server 320 may also have a games data function. This may comprise a memory to store the computer game program and a processor to run the games program.

The server may communicate via for instance the internet 310 to one or more user devices 305 and may further provide connections to a social network 330 such as Facebook™.

It should be appreciated that embodiments may be deployed in different system architectures. For example, the computer game may be implemented as a computer game that is stored in the memory 220 of the user device 200 and is run on the processor 215 of the user device 200. However, the server 320 may handle some elements of the game in some embodiments. By way of example only, a Java game applet may be provided to the user device 200 and the locally running Java applet will generate, for example, the graphics, sounds, and user interaction for the game play on the user device 200. Some data may be fed back to the server 320 to allow interaction with other players 305. The data which is fed back may also allow scoring and/or cross platform synchronization.

In some embodiments, the game may be implemented as a computer program that is stored in a memory of the system, for example the server 320, and which runs on a processor of the game server. Data streams or updates are supplied to the user device 200 to allow the user device 200 to render and display graphics and sounds in a browser of the user device 200. Such an approach is sometimes referred to as a web services approach. It should be appreciated, however, that such an approach does not necessarily require the use of the Internet.

Figure 4:
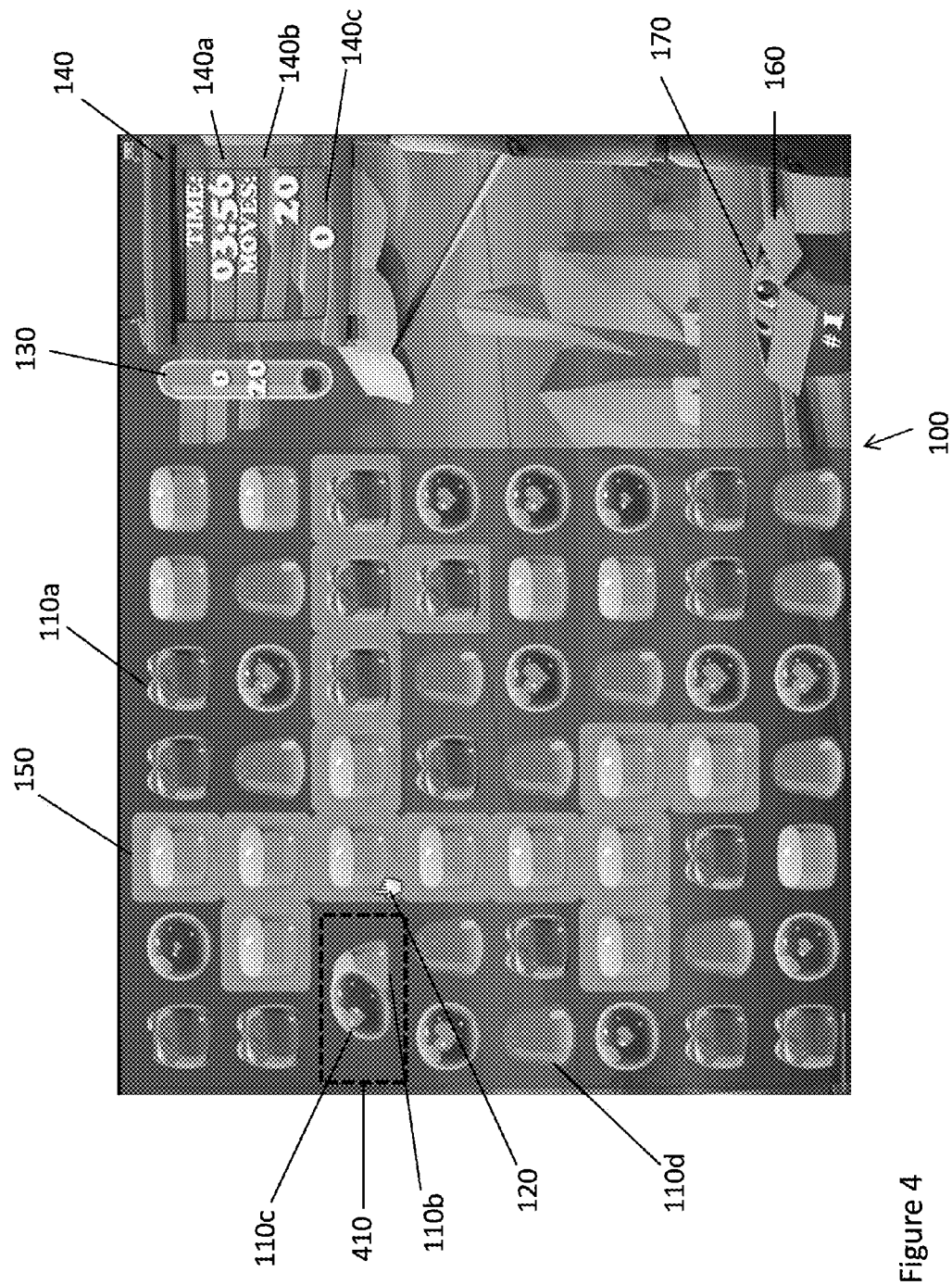
FIG. 4 shows switching of two game objects according to some embodiments.

Embodiments will now be described with reference to FIG. 4 and FIG. 5. FIG. 4 shows the game board of FIG. 1, the game board 100 comprising game objects 110a, 110b 110c, 110d, and target indicator 130 and game information indicator 140. FIG. 4 also shows the selection and movement, or "switching" of game objects 110b and 110c, with the game objects 110b and 110c being depicted in FIG. 4 as being in the middle of switching positions as indicated by area 410.

In this embodiment the user or player, has selected element 110b within area 410, and then indicated a switch horizontally with neighbouring game object 110c. Processor 215 or server 320 detects the input comprising a select and move or touch and move input from input means 265. This touch and move or switch input 265 results in four game objects 110b sharing at least one same characteristic occupying adjacent tiles on the game board 100 in 2×2 matrix. That is, the user has positioned or matched four identical game objects 110b in a 2×2 matrix.

The at least one processor 150 or server 320 compares the result of the switching move against a rule stored in memory 220. The rule predicates in this embodiment that game objects 110b arranged in a two by two matrix, (thereby forming a square of four objects on the game board 100) indicates the creation of a further game object.

Other embodiments may comprise other predefined patterns or shape configurations. For example, triangular, hexagonal, octagonal or other patterns may be provided, limited only by the game board configuration.

Figure 5:
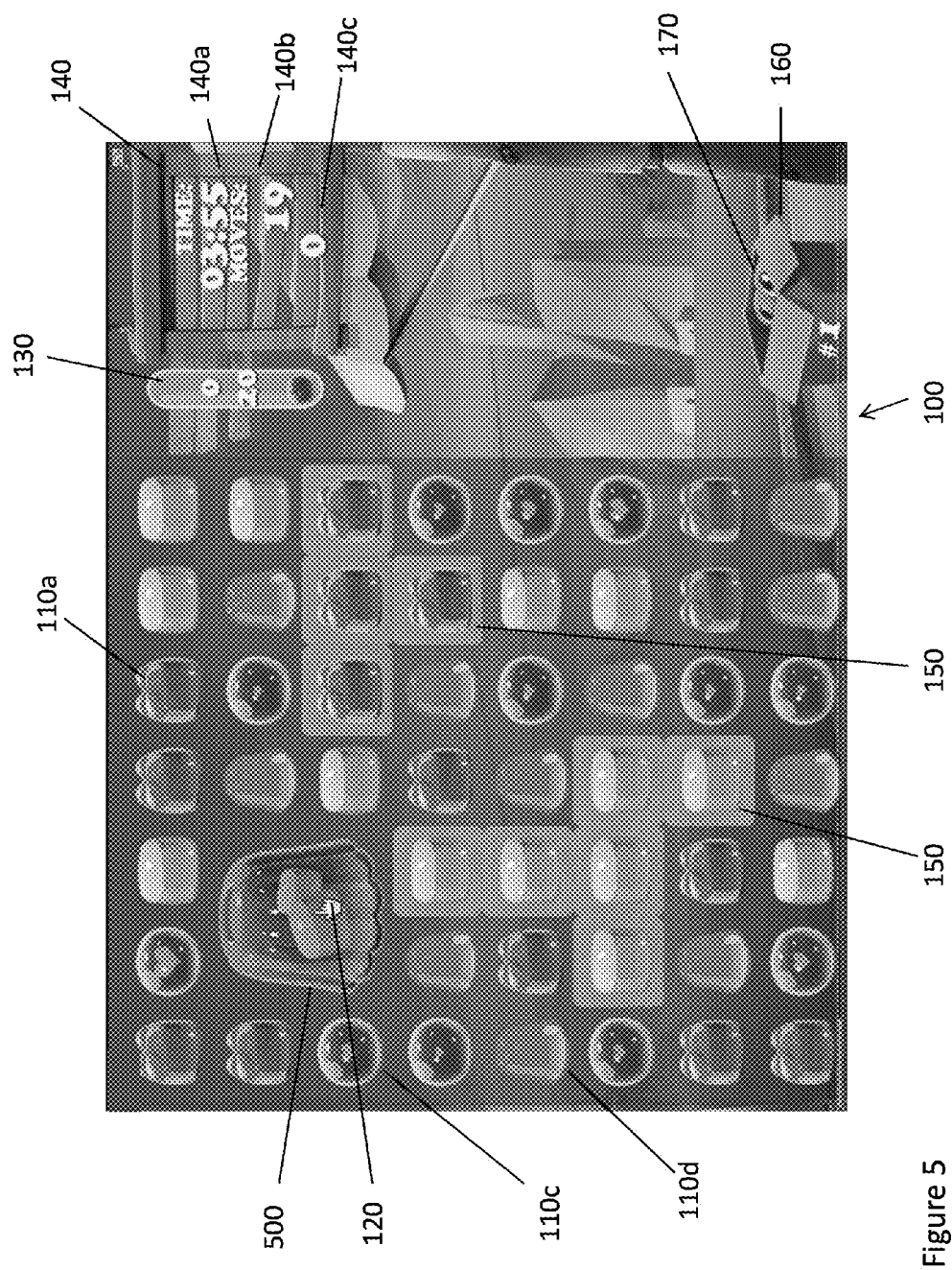
FIG. 5 illustrates creation of a further game object after switching.

FIG. 5 shows the replacement of the four matching game objects 110b in accordance with the predefined rule or rules stored in memory 220, with a further game object 500. The further game object depicted in FIG. 5 is a large graphical representation or version of the individual game objects 110b replaced in accordance with the rule.

Other embodiments may comprise differing further game objects being graphically depicted.

As shown in FIG. 5, the at least one processor or server has also reconfigured the highlighted region 150 previously highlighting neighbouring game objects 110b sharing the same characteristics and not arranged according to the predefined rule (see FIG. 4). This since reconfiguration of the game board has occurred owing to the creation of the further game object 500.

In some embodiments the further game object 500 is graphically depicted as a large jello or jelly. Of importance is the detection of the switching move, resulting in a multiple game object configuration or pattern on the game board 100 that matches a predetermined rule when processed by processor 215 or server 320.

In some embodiments the further game object 500 shares characteristics with the game objects 110b upon which it was created.

Subsequent selection 120 of the further game object 500, as indicated by selection indicator 120 in FIG. 5, may eliminate all matching game objects having the same characteristics as well as the further game object itself 500.

Hence a game mechanic which enables creation of further game objects to reach the target indicator 130 in skilful and engaging fashion is provided.

The reward versus cost benefits of such a mechanic reveals that, the switching move 410 results in a cost in that the move counter 140b is decreased. However, the creation of the further game object 500 may then accelerate the elimination of designated target game objects 130 to achieve the goal of the level. Such mechanics require predetermined rules and game behaviour technical considerations in order to finely balance the game and create an engaging game.

In some embodiments the further game element 500 retains its integrity, such that it can only be destroyed or eliminated by a user selecting or clicking the further game object 500.

In other embodiments the further game element 500 may only move vertically down with respect to the displayed game board 100 when matching game elements 110a situated immediately below the further game object are themselves eliminated by clicking on their respective group of 3 or 4 game objects.

Elimination of game objects adjacent to the further game object 500 may in some embodiments result in game objects of the game board 100 flowing or being displaced around the further game object 500.

Therefore, the further game object 500 may have further properties or characteristics defined in relation to normal game objects 110a, 110b, 110c, 110d which encourages skilful manipulation of game objects and strategic creation of further game objects 500.

This may be balanced against time 140a and/or available move 140b counters in order to achieve the indicated target 130.

In some embodiments the rule may comprise alternative matching patterns of game objects to create further game objects 500, for instance different sized array patterns or configurations such as 3×3, 4×4, 3×2, 3×4, may be allocated rules depending on the designer consideration and technical resources available across multiple different computer or computing devices, user devices and networks. Other shapes or patterns may be configured for example, other embodiments may comprise other predefined patterns or shape configurations. For example, triangular, hexagonal, octagonal, pentagonal, pyramidal or other patterns may be provided, limited only by the game board configuration.

Figure 6:
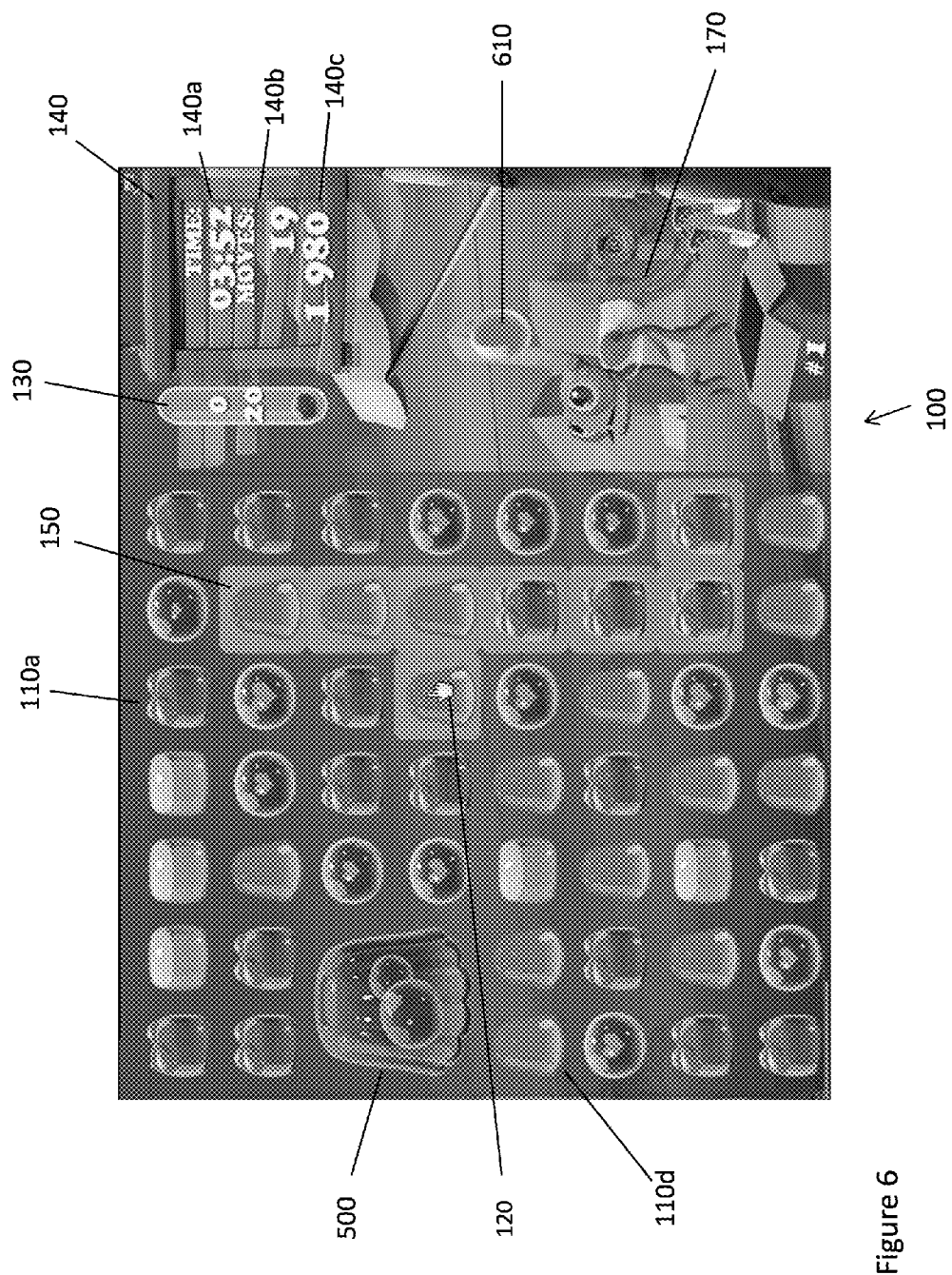
FIG. 6 illustrates a visual indicator of overall and bonus progress according to an embodiment.

FIG. 6 illustrates an embodiment of a visual progress and bonus indicator feature which may be used with the game board 100 described above. FIG. 6 shows the game board 100 having further game objects 500, a highlighted region 150 of game objects 110d and an overall game information indicator 140 and target information indicator 130.

FIG. 6 also depicts, in another embodiment, the game board 100 displaying a visual indicator 170 of progress towards the target 130. As can be seen in the embodiment of FIG. 6, the visual indicator is in the form of a cartoon chameleon 170. Also shown in the Figure is a visual indicator of a bonus multiplier 610 to the user in the form in this embodiment of a coloured balloon 610. The visual indicator 170 and bonus multiplier may be configured to display in various positions on the display, to indicate progress towards the target indicator 130 as the user completes or approaches the target 130. The bonus multiplier indicator 610 may increase subsequent scores for eliminating game objects in steps of 10% for example when grouped game objects 150 matching the characteristic of the visual bonus indicator 610 are eliminated.

The visual indicator may increase to for instance 20% or in any other appropriate step deemed by the designer, in dependence on the number of selections 120 the user makes against the number of switching moves 410 the user makes.

Therefore the visual indicator 170, 610 may be displayed with respect to a target position or achievement position on the display, and altering of the position may therefore indicate overall progress towards the level target 130, and may further indication the amount of bonus multipliers 610 currently achieved.

Figure 7:
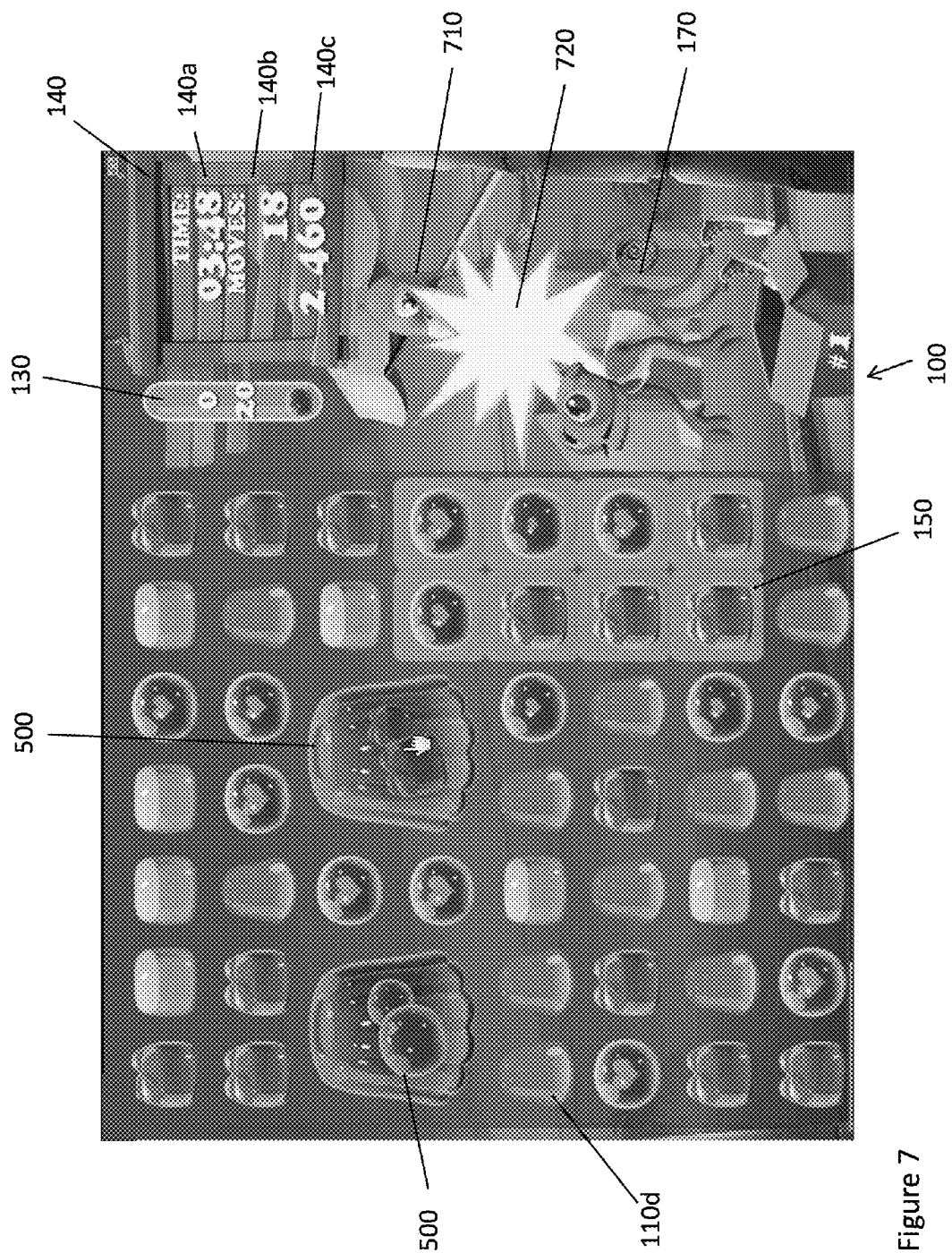
FIG. 7 shows a visual indicator of decreasing progress according to an embodiment.

FIG. 7 shows a result of a bonus multiplier being decreased in dependence on the user inputting for example a switch move 410. The indicator includes a bonus multiplier decreasing element 710, in this case as shown in FIG. 7, a graphical representation of a flamingo, popping 720 the balloon multiplier indicator 610 and the visual indicator 170 therefore floats downwards, indicating less bonus, and less moves 140b.

Other engaging elements 170, 710,720 and 610 may be employed in order to enthuse and engage the user to play and succeed at the game.

Figure 8:
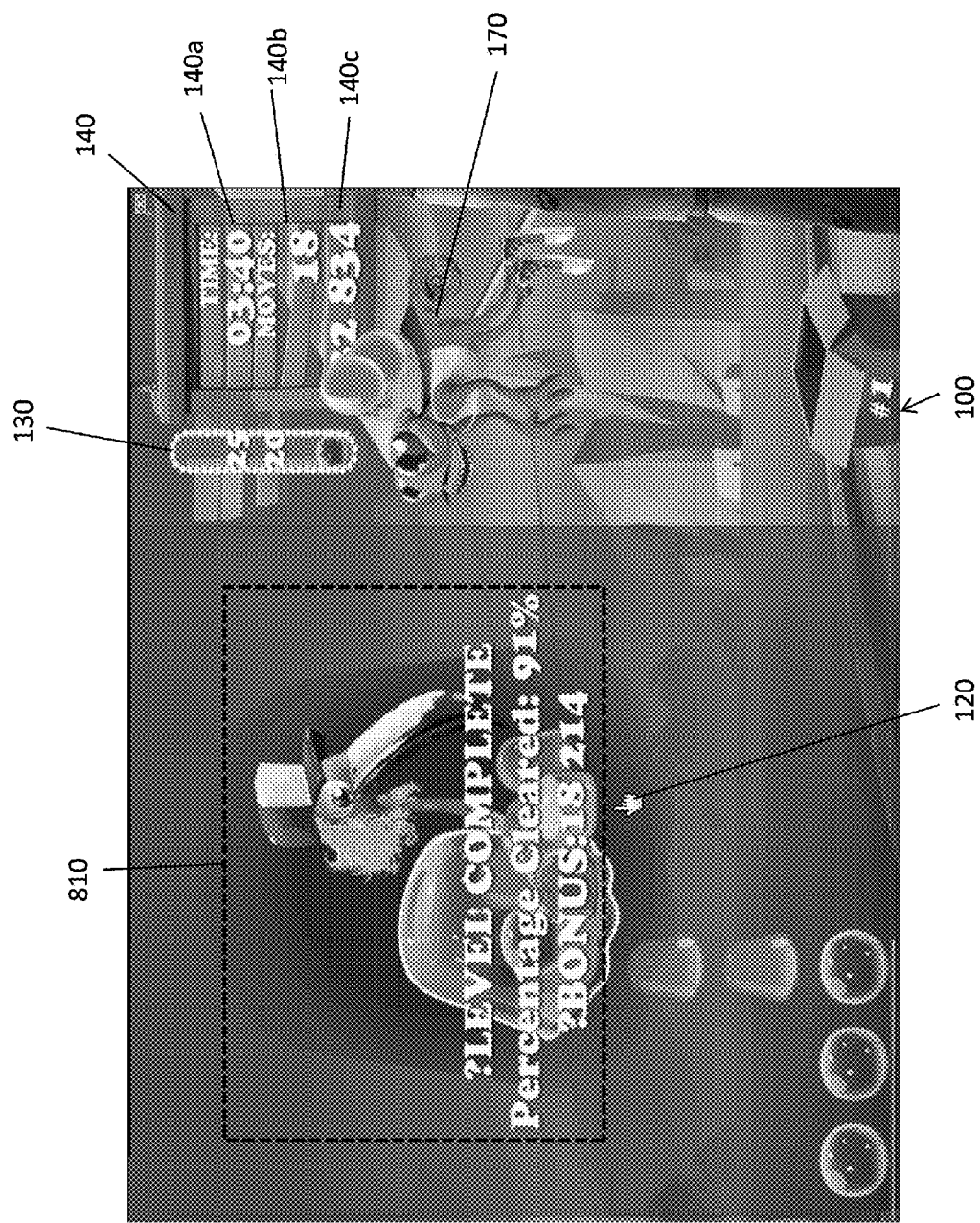
FIG. 8 illustrates a game board indicating completion of a level according to some embodiments.

FIG. 8 shows a game board 100 displaying 255 a state in which the user has completed the level by exceeding the target indicator 130. Various statistics 810 regarding the achievements of the user in completing the level are displayed 255, including for example as shown the percentage of all game objects 110a, 110b, 110c, 110d cleared and an overall bonus and score. FIG. 8 also depicts the visual indicator 170 at the top or complete position, just below information board 140. In other embodiments different completion information or statistics 810 may be displayed to the user, and the visual indicator 170 may be animated to further enthuse and engage the user to higher levels of accomplishment.

Figure 9:
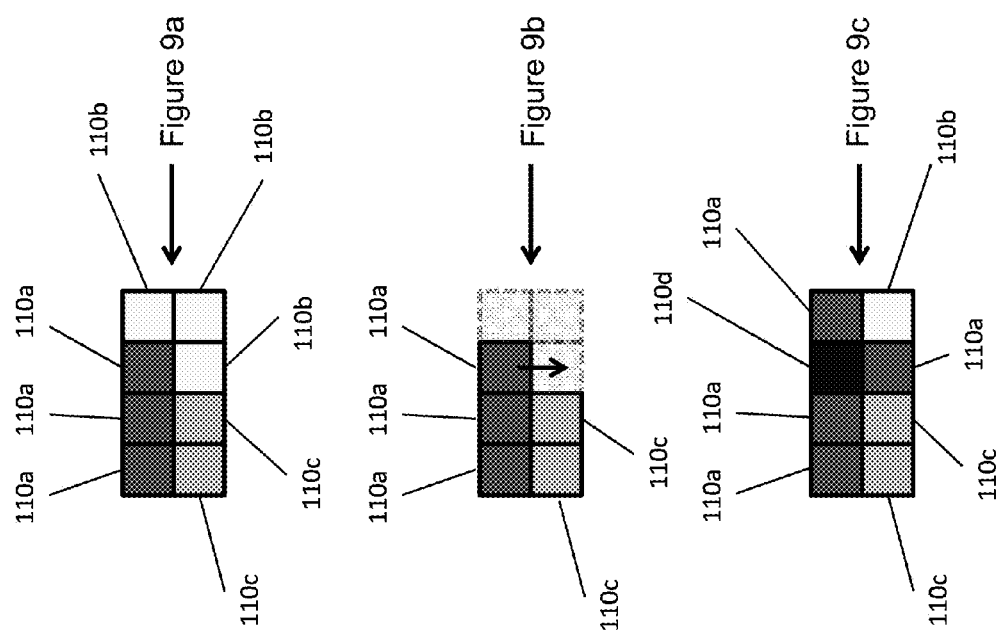
FIGS. 9a, 9b and 9c depict some game object behavior according to some embodiments.

FIGS. 9a, 9b, and 9c depict some embodiments of game object behaviour and associated rules.

FIG. 9a shows groups of neighbouring game objects 110a, 110b, and 110c, each group having different characteristics (as shown by colours or shading for simplicity in the Figure). In an embodiment, game objects 110a cannot normally be removed from the group 150 by the user, except by following the mechanism as shown via FIG. 9b and FIG. 9c.

FIG. 9b indicates that the processor 215 has detected selection 120 and therefore elimination of highlighted group 110b. The game objects and game board are then re-ordered. For example, the right-hand most game object 110a in FIG. 9b may then, following the elimination of group 110b, cascade downwards into the position immediately below as indicated by the vertical arrow in FIG. 9b.

FIG. 9c then shows the resulting state of the game board after the selection and elimination of group 110b, wherein the group 110a has now been split, with the right-hand most game object 110a of FIG. 9a now occupying the former position of element 110b which has been eliminated.

Figure 10:
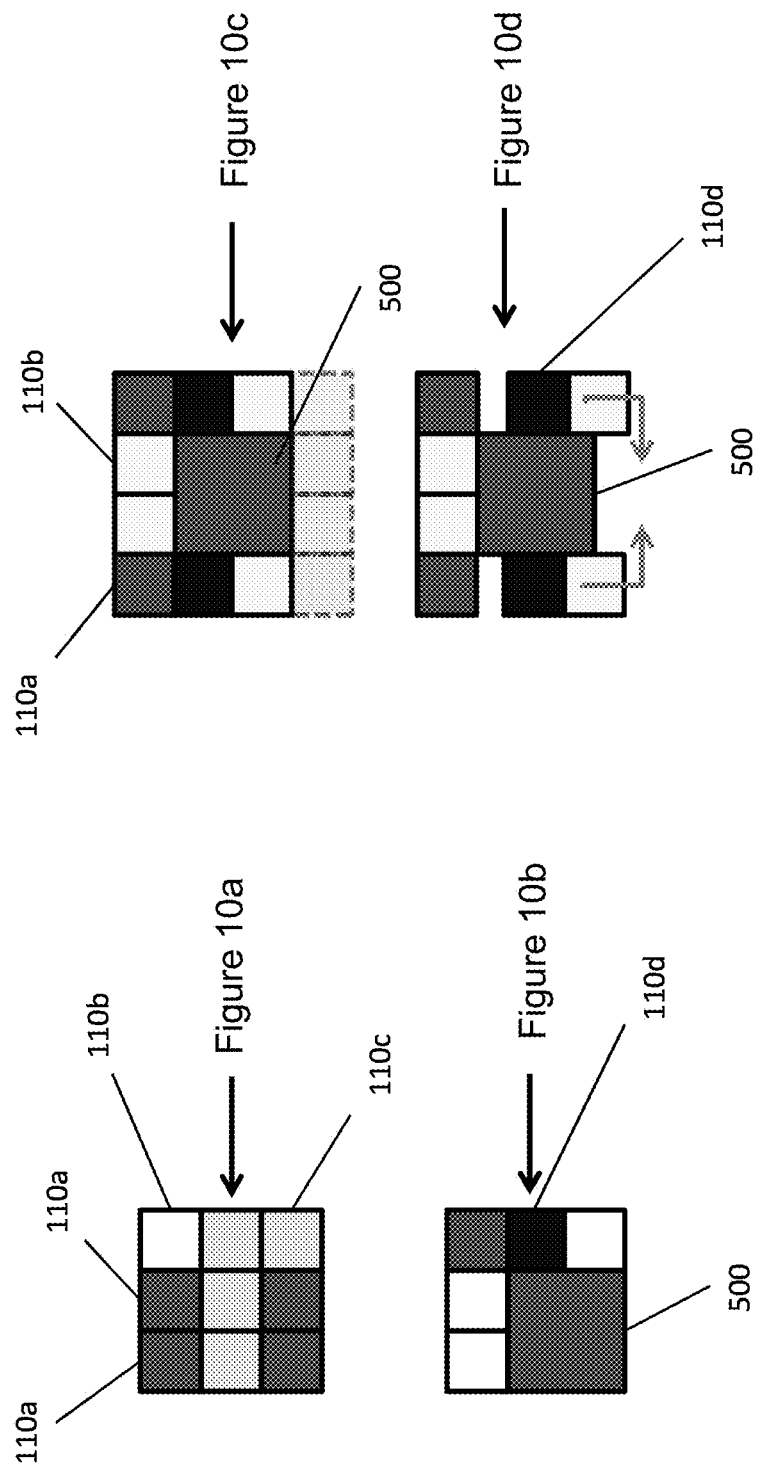
FIGS. 10a, 10b, 10c and 10d depict some further game object creation and example game object behavior according to some embodiments.

FIGS. 10a, 10b, and 10c, show examples of further game object 500 creation and behaviour in accordance with some embodiments. FIG. 10a depicts game objects 110a having a first characteristic with another adjacent group 110c of game objects with a second characteristic. FIG. 10b illustrates the result of the user selecting group 110c for elimination (i.e. the processor 215, 320 detects user input 265 comprising a click or select of group 110c highlighted 150 on game board 100). The two game objects 110a situated above the group 110c in FIG. 10a then cascade down to fill the game board spaces or tiles vacated by the elimination of group 110c.

In this embodiment the processor 215 detects the elimination and subsequent cascading or re-ordering or repositioning of the game objects into the position previously held by game objects 110c. The processor then determines that there is now a 2×2 array of game objects 110a with matching characteristics, compares this state against the predefined rule stored in memory 220, and therefore creates a further game object 500 and replaces original game objects 110a with the further game object 500 for display.

FIGS. 10c and 10d indicate a behaviour of the game objects 110a comprising the game objects 110b, 110d subsequently flowing around (FIG. 10d) around the further game object 500 when the game board is altered by a selection and elimination of game objects (FIG. 10c).

Figure 11:
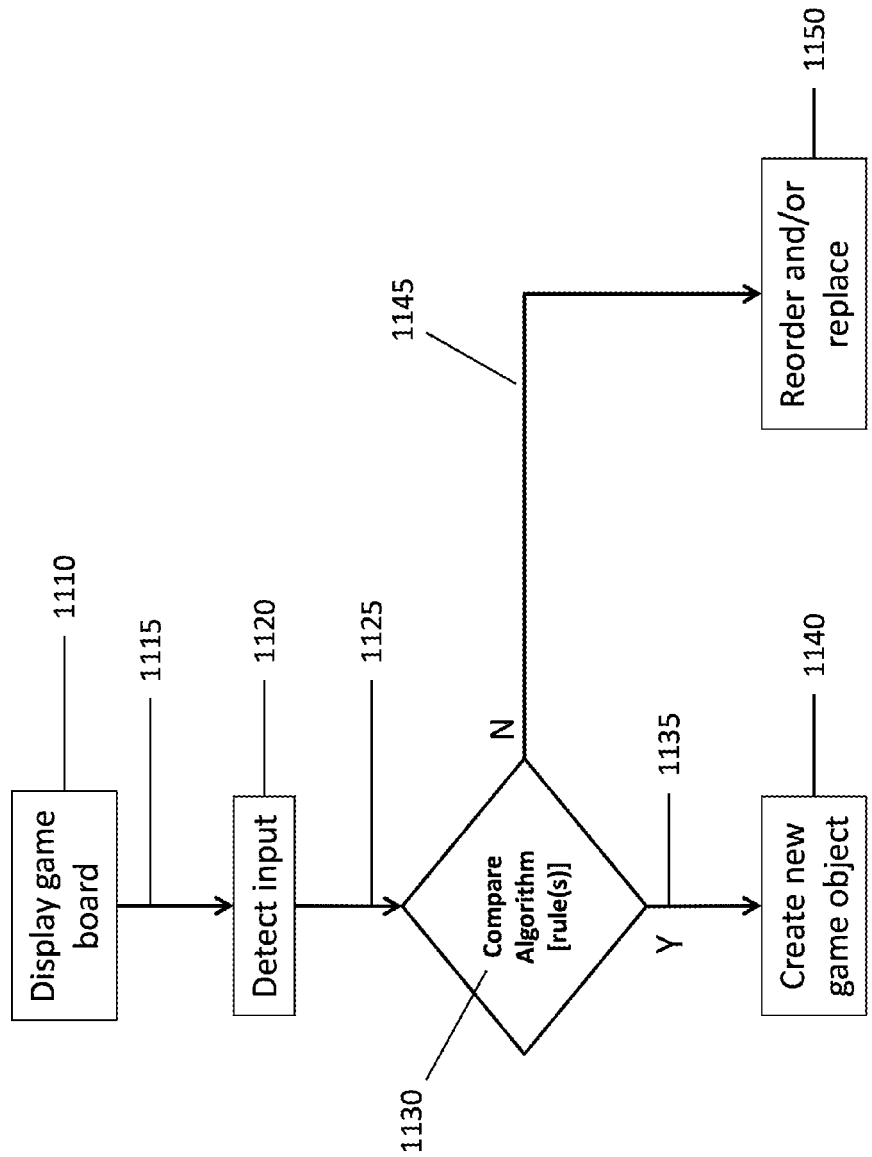
FIG. 11 is a flowchart depicting steps of a method according to an embodiment.

FIG. 11 is a flowchart detecting steps of a computer implemented method implemented by the at least one processor 215 or server 320 in accordance with an embodiment.

Game board 100 is displayed at step 1110 on the user device display 255 or via said server 320 on said user interface 265, 255 of device 200. The processor 215 or server 320 subsequently monitors the input 265 of the user interface of device 200. Upon detection of an input 265 control flows from step 1110 via path 1115 to step 1120 where input is detected.

The detected input may be either a selection or a selection and move 410.

The processor 215, 320 determines, via algorithm step 130 whether or not the input results in a matching game object pattern according to the at least one rule or rules stored in the at least one memory 220, 320.

If the rule conditions are satisfied, then the procedure flows via pathway 1135 (Y) to step 1140 where a further game object 500 is created. The further game object 500 then replaces the matching game objects 110b as per FIGS. 4 and 5, or FIGS. 10a and 10b as previously described.

If the input does not match the rule at step 130, the process proceeds via pathway 1145 to step 1150 where game object(s) may be selected and eliminated as described above, and subsequently replaced by new game objects which may cascade vertically with respect to the game board to fill the vacant positions of the game board 100 to re-order the game board Some embodiments of the game allows for the game to be synchronised between different devices or platforms.

The game can for instance be played in an offline mode on a handheld device using locally stored information on the handheld device. The device can store all or some of the levels that are available for the player to play in the game. Some of the features in the game can be locally run on the device and dependent on the local machine. This can for instance be that if the game is implemented to regenerate lives after a certain period of time, then the time can be locally decided based on the clock on the device. In some embodiments, the central game server clock can override the local clock when the local device has been synchronised with the server.

A game can be implemented so that the player knows if it has synchronised the available data with the central server or servers. This can for instance be through a coloured symbol or a check mark that indicates that the information is up to date.

The game can also indicate if it has been able to establish a connection with the central server for synchronisation or if for instance the network connection is down. That the device is offline can for instance be illustrated with a greyed out icon.

The game can be implemented to synchronize game state information and/or retrieve and connect to the social graph information and user profile of the player on a social network such as Facebook or Google+.

The game can also be implemented so that it is connected to a plurality of social networks. The user can be given the option to select what information that can be derived and shared with which social network.

One example of how the game can be connected to a social network is the Facebook™'s Open Graph API allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post event such as that a player has purchased objects in the game or received objects from other players of the game.

Those skilled in the art will recognise that the predefined rules defining game object behaviour and characteristics, further game object creation, and game object behaviour in relation to further game objects, may be stored in the at least one memory 220 of user device 200 or server 320 or system 300, and the judicial technical consideration of such predetermined rules and game object behaviour as described hereinabove may provide an engaging and rewarding experience to the user.

Furthermore, various methods have been described. It should be appreciated that these methods will be implemented in apparatus, where the apparatus is implemented by any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor.

It is also noted herein that while the above describes embodiments of the invention, there are several variations and modifications which may be made to the disclosed solution without departing from the scope of the present invention.

The invention claimed is:

1. A computer implemented method of controlling a display responsive to user engagement via a user interface, with a game board displayed on said display, the method comprising the following implemented by at least one processor of a computer device in communication with said interface, said display and at least one memory:
displaying a game board on said display, said game board having game objects of a first size, each game object having one or more characteristics;
detecting a first move comprising a selection of at least one game object with respect to said displayed game board in response to user input via said user interface;
re-ordering said selected game objects on said displayed game board in dependence on said user input;
in response to said re-ordering, determining by said at least one processor if a plurality of game objects satisfy at least one rule stored in said memory;
if so, creating a further game object of a second size, wherein said second size is greater than that of said first size, and wherein said further game object shares at least one of one or more characteristics of said plurality of game objects;
replacing said plurality of game objects with said further game object for display;
wherein in at least one subsequent move, at least one other game object is removed,
determining if said further game object can be moved to a space cleared by removal of said at least one other game object or if said space is smaller than said second size; and
in response to said determining, causing said at least one further game object to be moved to occupy said space at least partially, or causing at least one other game object to move around said further game object to occupy said space.

2. A method according to claim 1, wherein said at least one rule comprises said processor determining that the plurality of game objects occupy a predefined pattern or shape configuration on said game board, and the plurality of game objects of said pattern or shape configuration each have at least one same characteristic of the one or more characteristics.

3. A method according to claim 2, wherein user selection of a group of neighbouring game objects, each having at least one same characteristic of the one or more characteristics and not arranged according to the pattern or shape configuration of said at least one rule eliminates said group of neighbouring game objects.

4. A method according to claim 3, wherein the game board displays a visual indicator of progress towards a target, the visual indicator also indicating a bonus multiplier depending on the number of successive selections of groups of neighbouring game objects the user has input.

5. A method according to claim 4, wherein the visual indicator indicates that the bonus multiplier is decreased when a user inputs a movement selection input.

6. A method according to claim 1, wherein said at least one rule comprises said processor determining that the plurality of game objects in response to said input occupy a predefined pattern or shape configuration on said game board, and wherein said predefined pattern or shape configuration on said game board comprises an m by n array of said game board.

7. A method according to claim 6, wherein said further game object is repositioned with respect to a current position on the game board in dependence on the processor determining the elimination of game objects such that said space is m positions wide and immediately below the current position of the further game object.

8. A method according to claim 6, wherein the m by n array of said game board comprises a 2×2 array.

9. A method according to claim 1, wherein said further game object is eliminated from the game board by subsequent user selection.

10. A method according to claim 1, wherein selection of said further game object eliminates said further game object and all game objects having at least one same characteristic of the one or more characteristics on said game board.

11. A method according to claim 1, wherein said further game object is repositioned with respect to a current position on the game board to occupy one or more tiles or positions on said game board adjacent to and immediately below the further game object current position in dependence on the processor determining the elimination of game objects occupying said one or more tiles or positions adjacent to and immediately below the current position of the further game object.

12. A method according to claim 1, wherein the one or more game object characteristics comprise one or more of: attributes defining a displayed colour, and object type.

13. A method according to claim 12, wherein the object type is a graphical representation of a jello or jelly.

14. A method according to claim 1, wherein the at least one of the one or more characteristics shared by said further game object comprises attributes defining a displayed colour.

15. A method according to claim 1, wherein the at least one of the one or more characteristics shared by said further game object comprises object type.

16. A method according to claim 15, wherein the further game object is a larger graphical representation of said game object of said first size.

17. A method according to claim 15, wherein the object type is a graphical reprepresentation of a jello or jelly.

18. A method according to claim 1, wherein said display and said user interface are provided by a touch screen.

19. A device having:
a display configured to display a game board having game objects of a first size, at least one memory configured to store, for each game object, one or more characteristics, a user interface configured to receive user input, and at least one processor communicating with said at least one memory configured to:
detect a first move comprising a selection of at least one game object of a first size with respect to said game board in response to user input via said user interface;
re-order said selected game objects on said displayed game board in dependence on said user input;
in response to said re-ordering, determine by said at least one processor if a plurality of game objects satisfy at least one rule stored in said memory;
if so, create a further game object of a second size, wherein said second size is greater than that of said first size, and said further game object shares at least one of one or more characteristics of said plurality of game objects;
replace said plurality of game objects with said further game object for display;
wherein in at least one subsequent move at least one other game object is removed;
determine if said further game object can be moved to a space cleared by removal of said at least one other game object or if said space is smaller than said second size; and
in response to said determining, cause said at least one further game object to be moved to occupy said space at least partially, or cause at least one other game object to move around said further game object to occupy said space.

20. A device according to claim 19, wherein said at least one rule stored in said at least one memory comprises said processor determining that the plurality of game objects occupy on said displayed game board a predefined pattern or shape configuration stored in said at least one memory.

21. A device according to claim 19, wherein said at least one rule further comprises said processor determining that the plurality of game objects occupying a predefined pattern or shape configuration stored in said at least one memory each have at least one same characteristic of the one or more characteristics.

22. A device according to claim 19, wherein said at least one rule comprises said processor determining that the plurality of game objects occupy a predefined pattern or shape configuration stored in said at least one memory, and wherein said stored predefined pattern or shape configuration comprises an m by n array of said game board.

23. A device according to claim 19, wherein said processor controls said user interface to eliminate said further game object from the displayed game board in response to received user input of said user interface comprising user selection of said further game object.

24. A device according to claim 23, wherein said processor controls said user interface to eliminate said further game object and all game objects having at least one same characteristic as said further game object from the displayed game board in response to received user input of said user interface comprising user selection of said further game object.

25. A device according to claim 19, wherein said display and said user interface are provided by a touch screen.

26. A computer readable non-transitory storage medium carrying one or more sequences of instructions that, when executed by a processor, causes said processor to perform the following steps: displaying on a display a game board having a plurality of game objects, each game object having one or more characterstics;
detecting a first move comprising a selection of at least one game object of a first size with respect to said displayed game board in response to user input via a user interface;
re-ordering said selected game objects on said displayed game board in dependence on said user input;
in response to said re-ordering, determining by said at least one processor if a plurality of game objects satisfy at least one rule stored in said memory;
if so, creating a further game object of a second size, wherein said second size is greater than that of said first size, and wherein said further game object shares at least one of the one or more characteristics of said plurality of game objects;
replacing said plurality of game objects with said further game object for display on said user interface, wherein in at least one subsequent move, at least one other game object is removed;
determining if said further game object can be moved to a space cleared by removal of said at least one other game object or if said space is smaller than said second size; and
in response to said determining, causing said at least one further game object to be moved to occupy said space at least partially, or causing at least one other game object to move around said further game object to occupy said space.

* * * * *